(12) United States Patent  
Killpack et al.

(10) Patent No.: US 9,344,529 B2
(45) Date of Patent: May 17, 2016

(54) SYSTEM AND METHOD FOR PROCESSING AND DISPLAYING AGRICULTURAL DATA

(71) Applicants: David Killpack, Cedar Hill, TX (US); Lawrence McGinnis, Denton, TX (US); Steve Killpack, Logan, IA (US)

(72) Inventors: David Killpack, Cedar Hill, TX (US); Lawrence McGinnis, Denton, TX (US); Steve Killpack, Logan, IA (US)

( * ) Notice: Subject to any disclaimer, the term of this patent is extended or adjusted under 35 U.S.C. 154(b) by 491 days.

(21) Appl. No.: 13/840,330

(22) Filed: Mar. 15, 2013

(65) Prior Publication Data

US 2014/0273827 A1   Sep. 18, 2014

(51) Int. Cl.
*H04L 29/06* (2006.01)
*H04W 4/00* (2009.01)
*H04W 4/18* (2009.01)

(52) U.S. Cl.
CPC .............. *H04L 69/04* (2013.01); *H04W 4/008* (2013.01); *H04W 4/18* (2013.01)

(58) Field of Classification Search
None
See application file for complete search history.

(56) References Cited

U.S. PATENT DOCUMENTS

| 5,566,069 | A | 10/1996 | Clark, Jr. et al. |
| 6,751,576 | B2 | 6/2004 | Hall et al. |
| 8,068,952 | B2* | 11/2011 | Valentine et al. ............ 701/31.4 |
| 9,031,762 | B1* | 5/2015 | Bell et al. ........................ 701/99 |
| 2006/0106539 | A1 | 5/2006 | Choate et al. |
| 2010/0223009 | A1* | 9/2010 | Anderson et al. ................. 702/3 |
| 2011/0295460 | A1 | 12/2011 | Hunt et al. |
| 2011/0295500 | A1 | 12/2011 | Hunt et al. |
| 2011/0295638 | A1 | 12/2011 | Hunt et al. |
| 2012/0252364 | A1* | 10/2012 | Inabathuni et al. .......... 455/41.2 |

FOREIGN PATENT DOCUMENTS

WO   WO 2011/150351 A2   12/2011
WO   WO 2011/150353 A1   12/2011

OTHER PUBLICATIONS

AgJunction Link, AgJunction: 814-308-0328 Brochure,www.agjunction.com, 2 pages (date unknown).
AgJunction "Where all your data comes together" Brochure, Copyright GVM, Inc. Jun. 10, 2011, pp. 1-10.

* cited by examiner

*Primary Examiner* — Tuan A Tran
(74) *Attorney, Agent, or Firm* — McKee, Voorhees & Sease, PLC

(57) ABSTRACT

A system for synchronizing agricultural data uses a synchronization device adapted to receive information from a storage medium associated with a monitor for an agricultural implement. The synchronization device has wireless communication with a mobile device to share the information from the monitor with the mobile device. The mobile device will compress and store the data until the mobile device has communication coverage. Once the mobile device has communication coverage, it will automatically communicate the compressed data to a remote server, such as a cloud server. The server will process the data. The processed data may be communicated back to the monitor via the mobile device and the synchronization device. The processed data may also be accessed on the server by a remote computer.

9 Claims, 14 Drawing Sheets

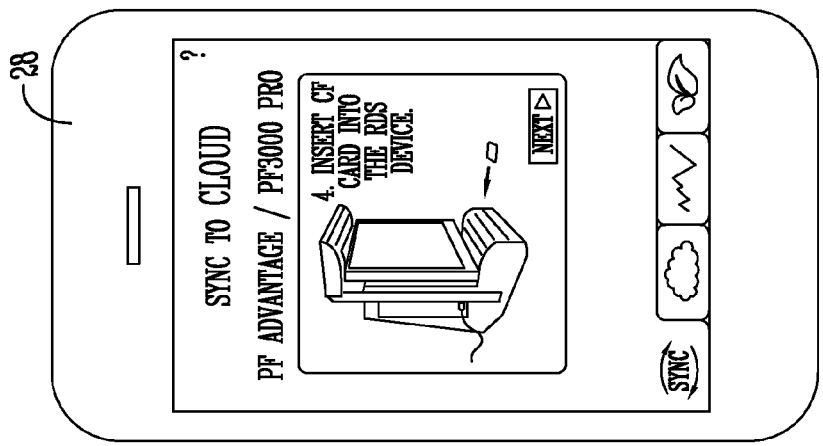
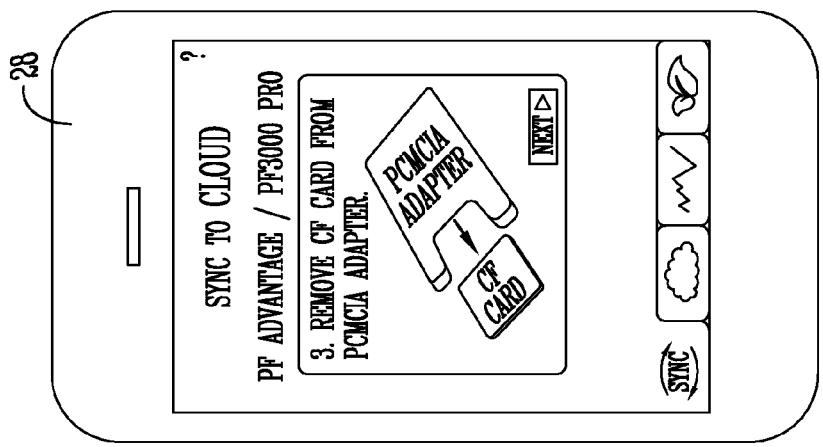
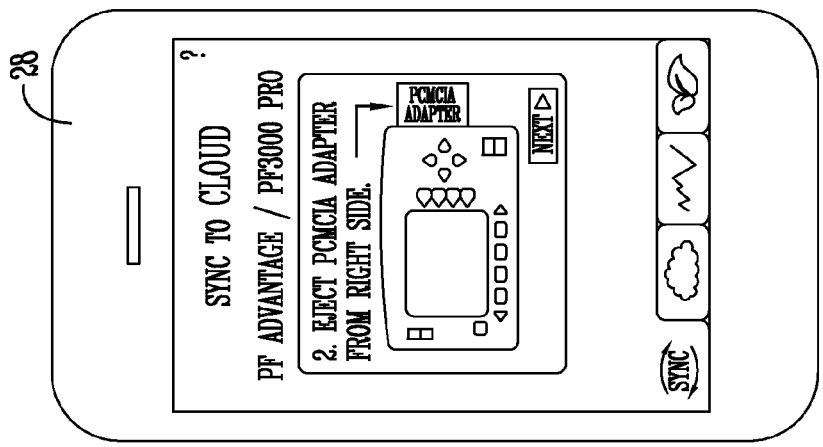

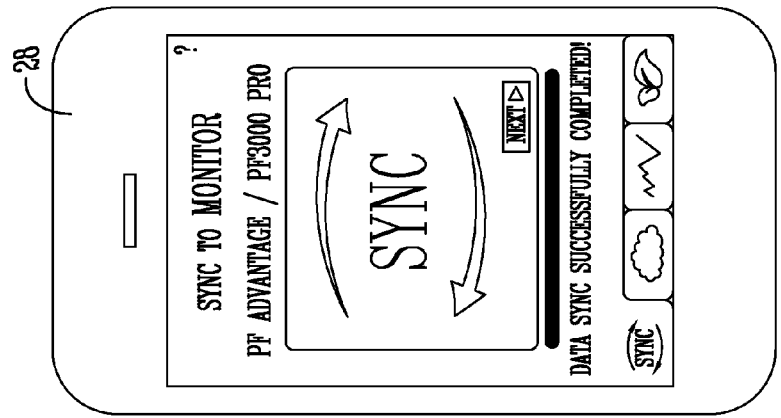
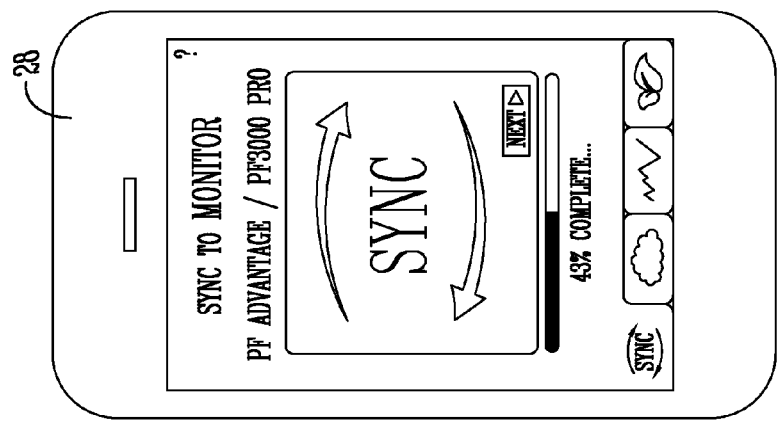
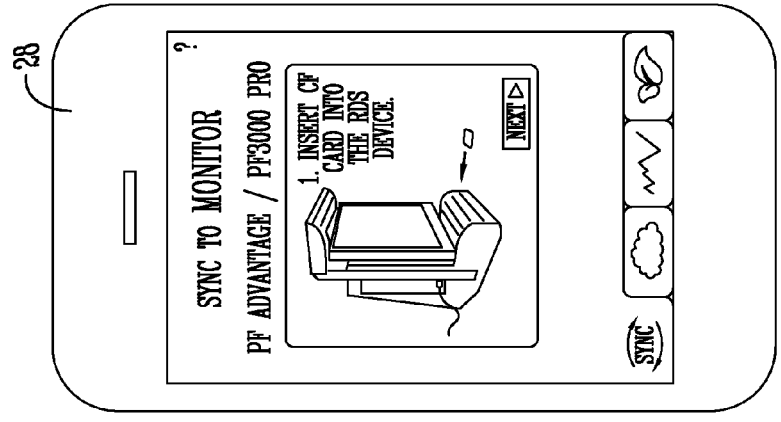

SYSTEM AND METHOD FOR PROCESSING AND DISPLAYING AGRICULTURAL DATA

FIELD OF THE INVENTION

This invention relates generally to precision farming. More specifically, the invention relates to systems and methods for remotely synchronizing agricultural information generated by precision farming.

BACKGROUND OF THE INVENTION

Modern farming can generate vast amounts of information. However, making efficient and timely decisions is often difficult with current data management systems. Precision agricultural equipment permits growers to capture data from a large number of sensors and monitors developed by multiple manufacturers on various storage media. The storage media include PCMCIA, CF, SD, and USB. Many growers use several types of equipment which may have different storage media. To accommodate these varied storage media, growers are required to transport the storage media to a dedicated desktop application or service provider, copy the data to the desktop application, extract the data from the storage media, and then analyze the data. This process is inefficient and can prevent growers from using the data for all decisions that could benefit from use of the data. For example, growers can often capture the greatest discounts on seed and fertilizer if they make their buying decision within a few weeks of harvest. However, this time frame can be difficult to meet with the farmer is required to bring the various storage media to a remote computer in order to extract the data. Furthermore, many planting, fertilizing, and harvesting processes could benefit from real-time, or nearly real-time processing of data collected by agricultural implements during these processes.

SUMMARY OF THE INVENTION

According to one embodiment, the present invention is directed to a system for processing and displaying agricultural data that includes a monitor adapted to receive implement data from an agricultural implement and adapted to store the implement data on a monitor storage medium. The monitor further includes a display screen. A synchronization device includes equipment to receive the implement data from the monitor storage medium. The synchronization device further includes a synchronization device short-range communicator. A mobile device has a mobile device short-range communicator and long range communication equipment. The mobile device short-range communicator is in communication to receive the implement data from the synchronization device short-range communicator. The mobile device further includes a processor programmed with an application. A server is adapted to receive information transmitted by the mobile device long range communication equipment. The server is further adapted to manipulate the implement data into processed agricultural data. Optionally, the application may cause the mobile device to control the synchronization device. The mobile device may be adapted to access the processed agricultural data from the server. The mobile device may be adapted to transmit the processed agricultural data to the synchronization device. The processor of the mobile device may be adapted to compress the implement data to a compressed format. The application may cause the mobile device to send the implement data in a compressed format to the server automatically when the mobile device has cellular communication coverage. The application may cause the mobile device to store the compressed format implement data until the mobile device has cellular communication coverage. The application may cause the mobile device to display instruction screens instructing a user how to synchronize data from the monitor to the server using the synchronization device. The application may include a plurality of sets of instruction screens corresponding to a plurality of different types of monitors. The processor of the mobile device may adapted to select a set of instruction screens corresponding to the monitor from the plurality of sets of instruction screens based on a scanned code, such as a quick response code ("QR code").

According to another embodiment, the present invention is a synchronization device for synchronizing agricultural data between a mobile device that has periodic cellular communications coverage and a monitor associated with an agricultural implement, the monitor including a storage medium for storing data received from the agricultural implement. The synchronization device includes a protective case, a card reader for reading data from the storage medium, a USB input for creating a connection with the storage medium, and a short range wireless communicator for communication with the mobile device. The synchronization device may further include a first circuit board that permits the synchronization device to act as a USB master and a second circuit board that permits the synchronization device to as a USB slave. The synchronization device may further include an LED light to indicate a status of the synchronization device. The protective case may include a removable cover that has a translucent portion and an opaque portion, and wherein the translucent portion is shaped in a desired pattern. The protective case may include a cradle for selectively securing the mobile device to the synchronization device.

According to yet another embodiment, the present invention is directed to a method of processing and synchronizing data from an agricultural implement by providing a synchronization device including data receiving equipment to receive data from a storage medium associated with the agricultural implement. The synchronization device further includes a synchronization device short-range communicator. Data is extracted from the storage medium using the data receiving equipment. A connection is established with a mobile device using the synchronization device short-range communicator. The extracted data is pushed to the mobile device via the established connection. The extracted data may be downloaded from the mobile device to a remote server. The extracted data may be compressed with the mobile device. The downloading the extracted data step automatically may be performed only upon determining that communication coverage exists.

BRIEF DESCRIPTION OF THE DRAWINGS

FIGS. 6A-J illustrate screenshots on a mobile device guiding a user how to synchronize data from a particular type of agricultural monitor to a remote server according to one embodiment of the present invention.

FIGS. 7A-H illustrate screenshots on a mobile device that guide a user how to synchronize data from a remote server to a specific type of agricultural monitor according to one embodiment of the present invention.

DETAILED DESCRIPTION OF THE PREFERRED EMBODIMENTS

Figure 1:
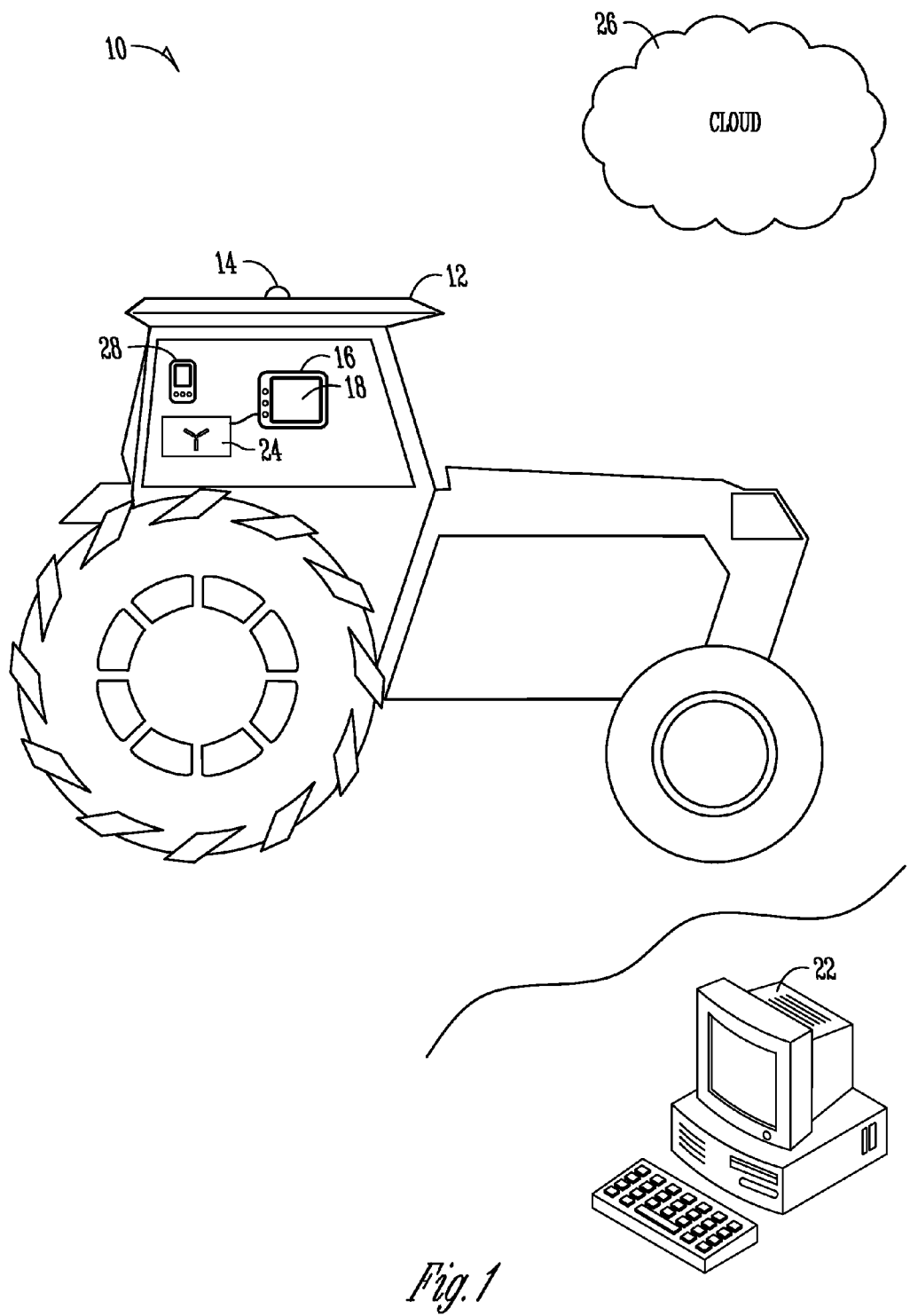
FIG. 1 is a schematic showing a system for processing and displaying agricultural data according to one embodiment of the present invention.

FIG. 1 is a schematic showing a system 10 for processing and displaying agricultural data. The system 10 may include a tractor 12, or other similar agricultural vehicle. The tractor 12 may itself be considered an agricultural implement, and may have attached any of a variety of other agricultural implements (not shown) such as planters, sprayers, combines, and the like. Typically the tractor 12 will include global positioning system (GPS) equipment 14 for use in precision agricultural processes. Alternatively, or in addition, implements connected to the tractor 12 may also include GPS equipment to permit precise tracking of the location of the agricultural implements as they are used in a grower's fields. Precision agricultural implements will generally include a monitor 16.

The monitor 16 typically accomplishes a few purposes. The monitor 16 will generally include a display screen 18 that provides a user with information about the agricultural implement or implements with which it is associated and the process is being performed by those implements. The monitor 16 may also include some type of controls 20 in order for a user to provide input and generally interface with the monitor 16, which in turn interfaces with the agricultural implement. The controls 20 may be push buttons, a keyboard, or a touchscreen. Generally, the monitor 16 will include some type of electronic data storage medium. This electronic storage medium will receive and store data received from the agricultural implement 12. One common type of storage medium is a removable memory card. In these memory card systems, data is extracted from the storage medium by removing the memory card from the monitor 16 and taking it to a remote computer 22, such as a computer located at the grower's house or office, and inserting the card into a card reader (not shown) associated with the computer. Alternatively, some monitors 16 may include outlet ports, such as a USB outlet that permits a grower to insert a portable storage device, such as a thumb drive, USB stick, or the like, to copy data from the monitor 16. The present invention, as shown in FIG. 10, represents an improved mechanism for extracting and using the data from the monitor 16.

According to one aspect of the present invention, a synchronization device 24 is provided. Generally speaking, the synchronization device 24 is a device that utilizes mobile networking capabilities to efficiently and effectively transmit data from the field to a computing system, and allows for data to flow back from the remote computing system to the monitor 16 through the synchronization device 24 after that data has been processed on the remote computer network. The remote computer network may be a cloud 26 arrangement or may be some other server or network of servers. The synchronization device, as will be described in more detail below, is adapted to receive an input of data related to the agricultural implement from the monitor 16. For example, a USB cable 26 may be provided between the monitor 16 and the synchronization device 24 to permit implement data to be transferred from the monitor 16 to the synchronization device 24. Additionally, the synchronization device 24 may include several options for receiving data input so that the synchronization device 24 can be used with a variety of brands and types of monitors 16.

The system of FIG. 1 also includes a mobile device 28. The mobile device is an electronic device with long range communication equipment included within it, for example, a cellular telephone, a tablet computer, or a laptop computer with cellular communication capabilities. Standard existing products, such as smartphones and tablets that a grower is likely to already possess may be used as the mobile device 28. Preferably, the mobile device 28 will also include a short range communication capability, such as Bluetooth, or the like. The synchronization device 24 is preferably equipped with compatible short range communication capabilities and equipment to permit it to be linked wirelessly with the mobile device 28 to receive and send information from and to the mobile device 28.

Figure 2:
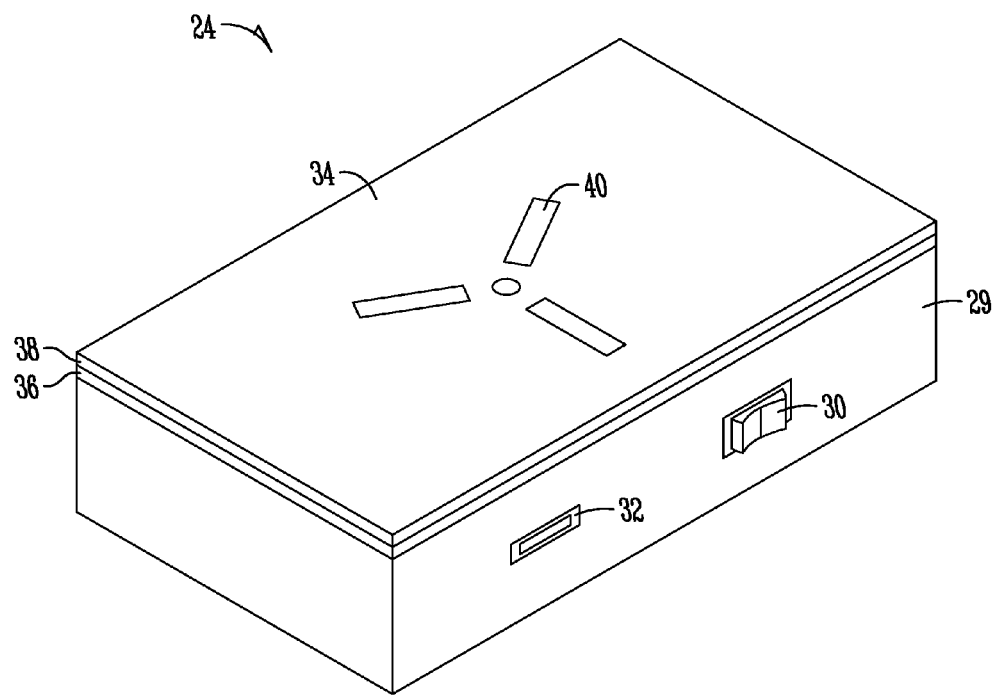
FIG. 2 is an isometric view taken generally from the front of a synchronization device according to one embodiment of the present invention.
Figure 3:
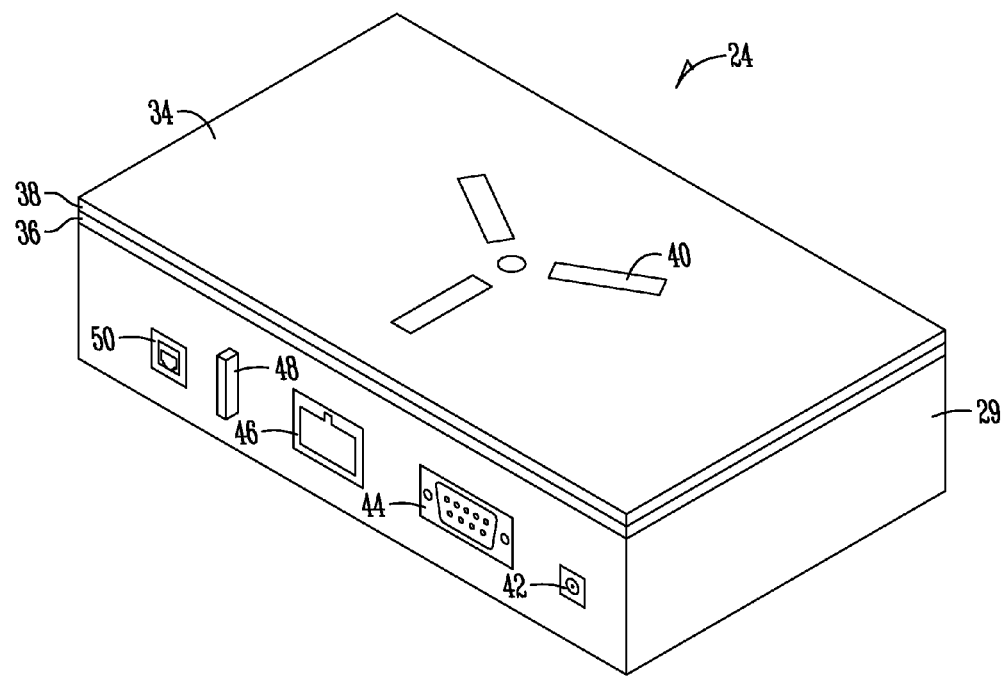
FIG. 3 is an isometric view of the synchronization device of FIG. 2 taken generally from the rear.
Figure 4:
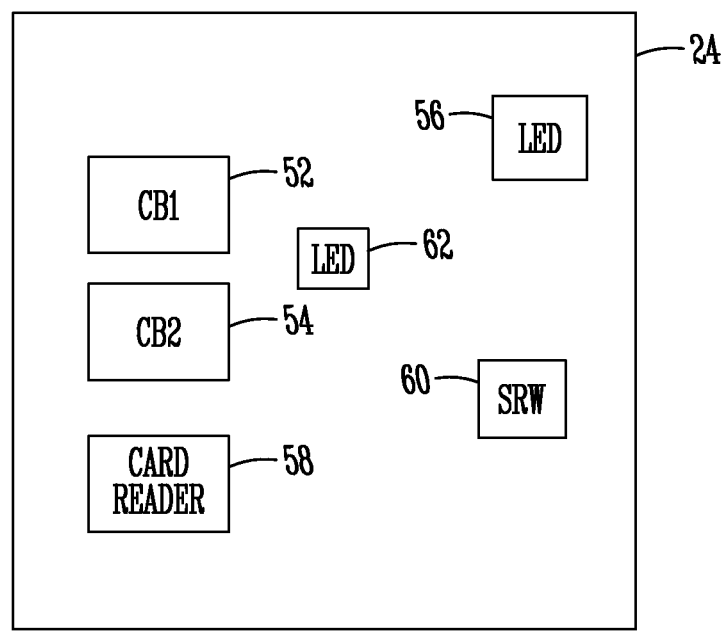
FIG. 4 is a schematic illustrating some of the components contained within the synchronization device of FIG. 2.

FIGS. 2, 3 and 4 disclose additional details of a preferred embodiment of a synchronization device 24. As seen in FIG. 2, the synchronization device 24 includes a lower case 29 that generally contains, and covers the components of the synchronization device 24. As shown, the case 29 is generally a rectangular prism. Other shapes may be chosen for the case 29. Preferably the case 29 will be aesthetically pleasing, and durable in order to protect the components of the device 24. A front face of the case 29 may be provided with an on/off switch 30 as well as a card reader receptacle 32. Alternatively, more than one card reader receptacle 32 may be provided if it is desired for the synchronization device 24 to be able to read multiple types of memory cards.

According to the embodiments shown in FIGS. 2 and 3, the synchronization device 24 includes an aesthetically pleasing acrylic top 34. The acrylic top 34 includes a lower acrylic sheet 26 and an upper acrylic sheet 38. The upper acrylic sheet 38 is simply a clear piece of acrylic. The lower acrylic layer 36 is generally opaque, but has a transparent pattern 40 formed in it, to permit light to be transmitted through the lower acrylic layer 36 in the shape of pattern 40. The pattern 40 may be provided over LEDs or other lights, which are provided within the synchronization device 24. The lights may be illuminated and visible through the pattern 40 to provide status information to a user about the synchronization device 24. For example, a yellow light shining through the pattern 40 may indicate that the synchronization device 24 is ready to connect and synchronize with the monitor 16. A green light may indicate that a connection has been established and synchronization is occurring. A red light may indicate that there has been a failure to connect, or that connection has been lost. Preferably, the acrylic panels 36 and 38 may be removable, so that the lower acrylic layer 36, which includes the pattern 40, may be replaced if a different pattern is desired. This permits flexibility in the branding of the synchronization device 24, and would permit, for example, different logos to be used as the design 40 to permit the synchronization device 24 to be visually consistent with the different brands of monitors. Alternatively, the pattern 40 could be made into any desired aesthetic pattern, such as a visually pleasing design, or a logo corresponding with a favorite athletic team or the like.

In FIG. 3, a rear face of the synchronization device 24 can be seen. The rear face is provided with a power inlet 42 that permits the device 24 to receive power, for example, from a standard 12V outlet such as is commonly included on an agricultural vehicle 12. A nine-pin receiver 44 is provided to permit the synchronization device 24 to be connected to a device with a nine-pin output. Typically this nine-pin receiver 44 will be used for connecting directly to an output from an agricultural implement 12, without having the data from the implement 12 pass through the monitor 16. A network outlet 46, such as an Ethernet outlet, is provided to permit the synchronization device 24 to be connected to a computer or computer network. A USB Type A port 48 and a USB Type B port 50 are also provided to permit data exchange with monitors 16 that include USB capability. Other types of inlets and outlets for sending and receiving data may be used as desired.

The basic function of the synchronization device 24 is to act as an interface between the monitor 16 and the mobile device 28. In general, the synchronization device 24 takes data that was pushed to the synchronization device 24 from the monitor 16 and transmits that data to the mobile device 28. The mobile device 28 can then use its long range communication capabilities, especially via a cellular telecommunications network, to transmit that data received from the monitor 16 via the synchronization device 24 to a cloud network 26, or other type of computer network that permits extensive processing and analysis of the data. The processed data on the cloud can be accessed by the mobile device 28, or by other computers 22 that are located remotely, such as at a grower's home or office.

FIG. 4 shows a schematic representation of several of the elements contained within the synchronization device. The synchronization device 24 includes first and second circuit boards 52 and 54. The circuit boards 52 and 54 act as computer processors that control the functioning of the synchronization device 24. A power supply 56 is connected with the power jack 42 to receive and distribute power to elements of the device 24. At least one, and preferably a few, card readers 58 are provided to read cards that are inserted into the device 24 through card reader receptacles 32. A short range wireless communication device 60, such as a Bluetooth device, is provided within the synchronization device 24 to permit wireless connection with the mobile device 28. Indicator lights, such as LED 62, are provided within the synchronization device 24 to serve as indicators of the status of the device 24. The first circuit board 52 generally controls the processes associated with exchanged information with the monitor 16. The second circuit board 54 generally controls the processes associated with exchanging information with the mobile device 28.

The synchronization device 24 may be adapted to cause the download of an application also known as an app to a mobile device 28 that links with the synchronization device 24 through the short range wireless communication equipment. Alternatively, the synchronization device 24 may provide an internet link or instructions on how a user may download a necessary app to the mobile device 28 to permit use of the mobile device 28 as part of the system 10. The app will act as a wizard to guide a user through setup the first time they link the mobile device 28 with the synchronization device 24.

Figure 5:
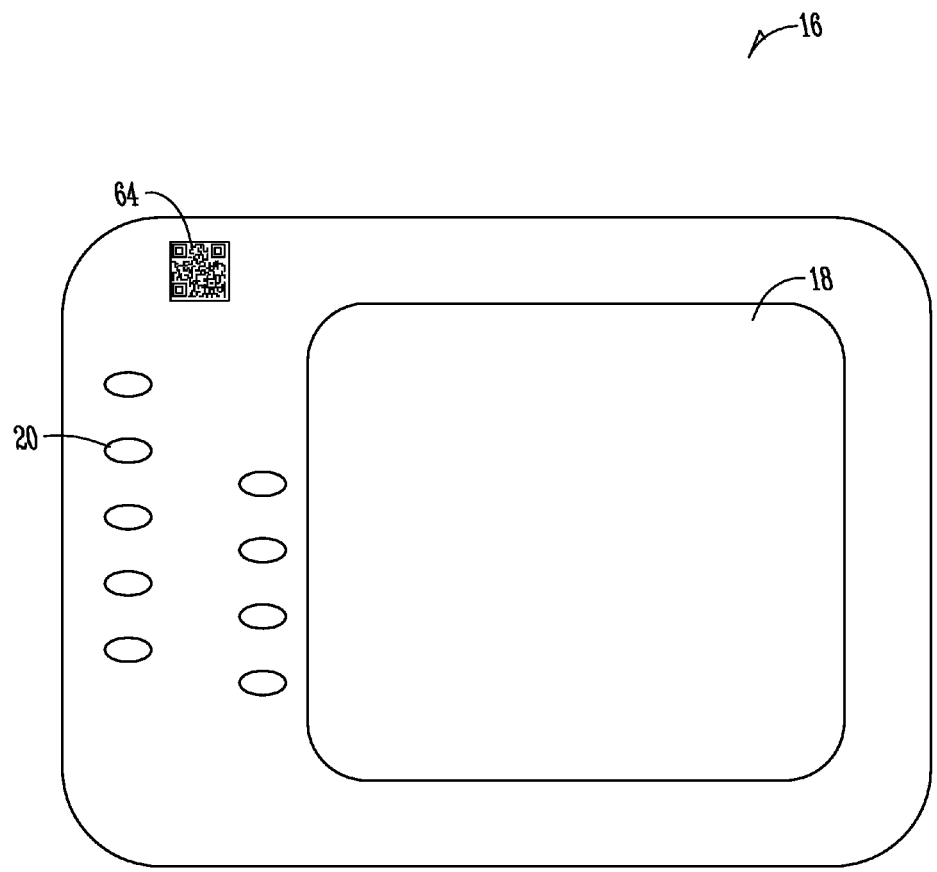
FIG. 5 is a front view of an agricultural monitor including a 2D bar code sticker that might be used according to one embodiment of the present invention.

The mobile device 28 can then be used by the user as a control for the system 10. A visual indicator, such as a 2D barcode or a QR code may be used to indicate to the mobile device 28 which type of monitor 16 is being utilized. Therefore, a plurality of QR code stickers may be provided with the synchronization device 24. Each of the QR code stickers will correspond with a particular type of monitor. A user will then scan the appropriate QR code sticker in order to download the appropriate software and run the appropriate app for the particular monitor being used. FIG. 5 shows a monitor 16 on which a QR code sticker 64 has been adhered. Scanning of the QR sticker 64 with the mobile device 28 will initiate launch of the app on the mobile device 28.

Figure 6A:
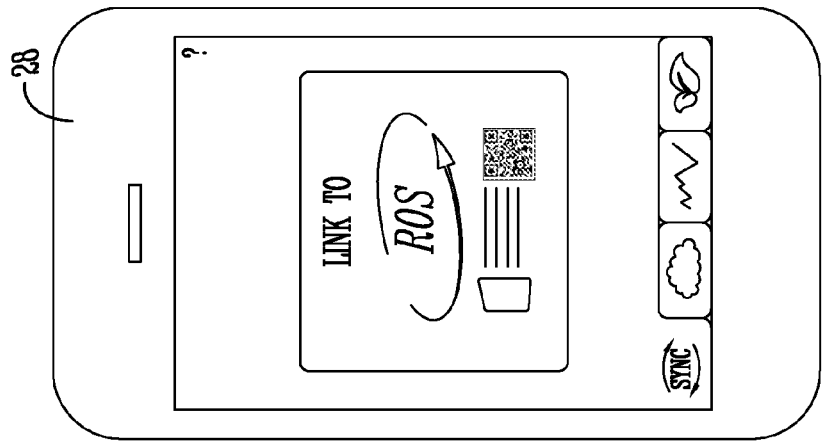
Figure 6B:
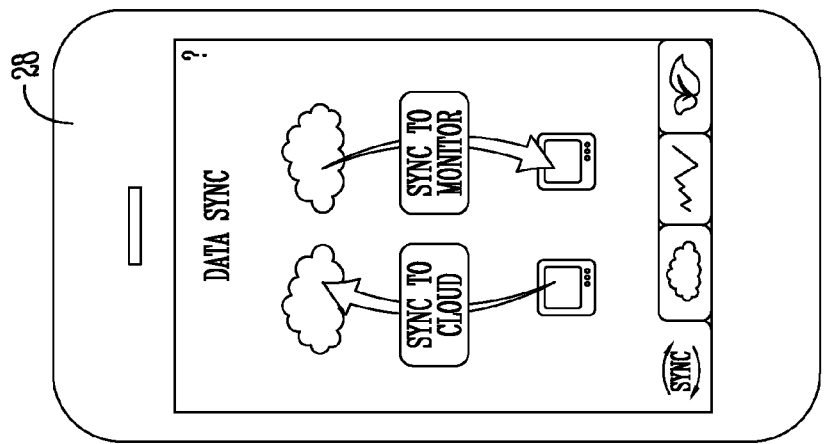
Figure 6C:
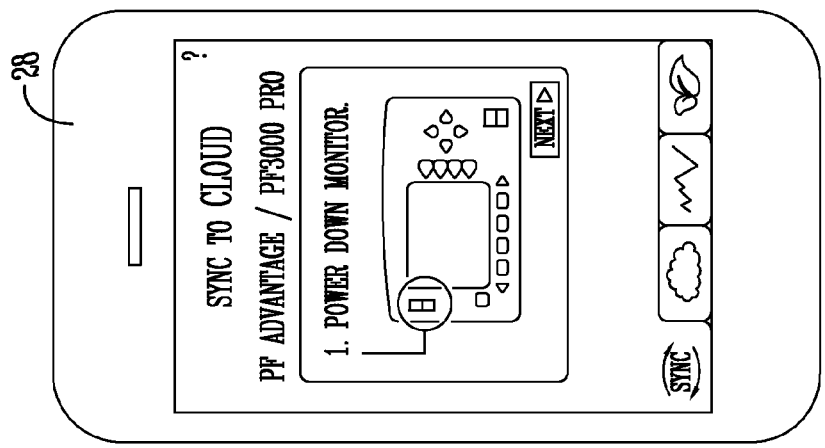
Figure 6G:
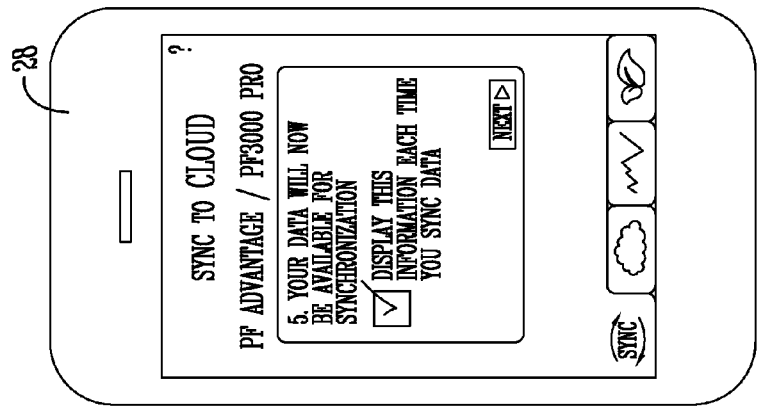
Figure 6H:
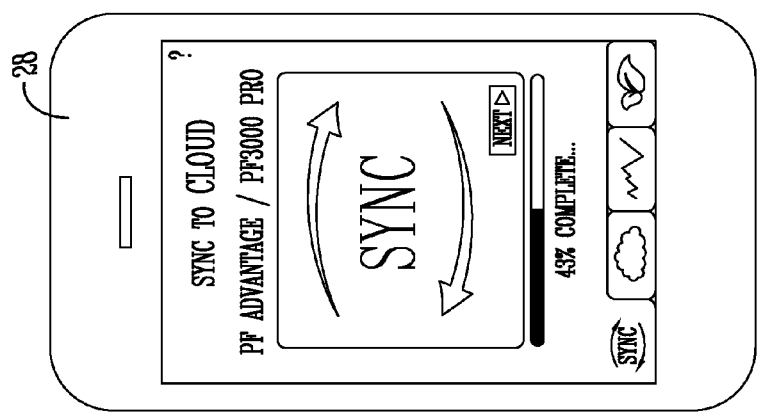
Figure 6I:
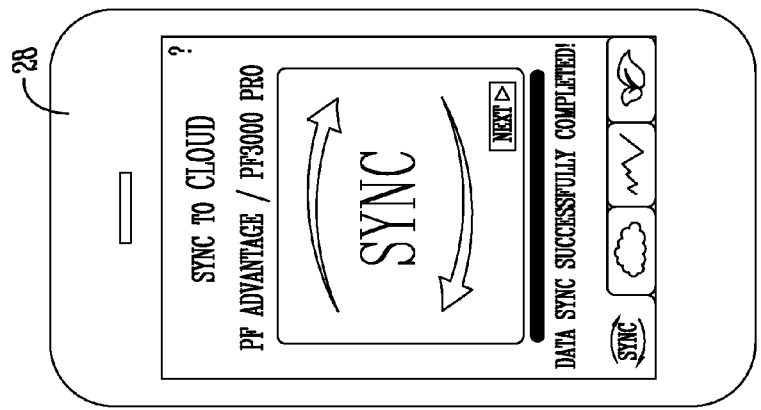
Figure 6J:
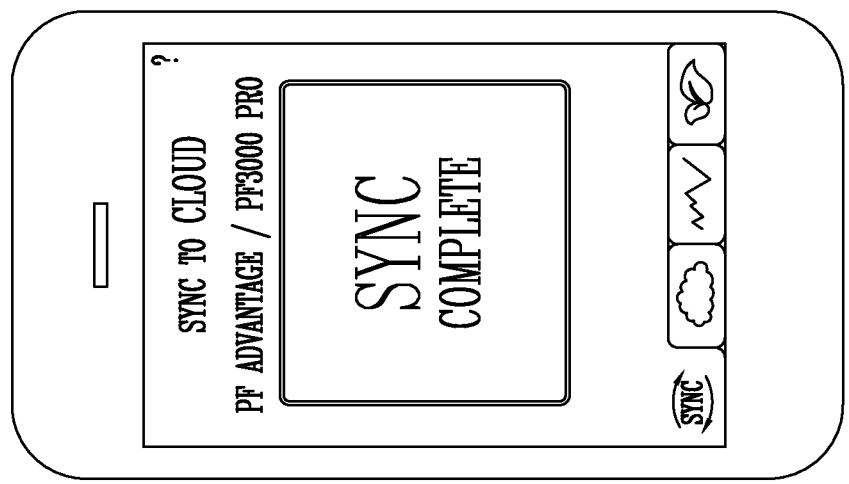
Figure 7F:
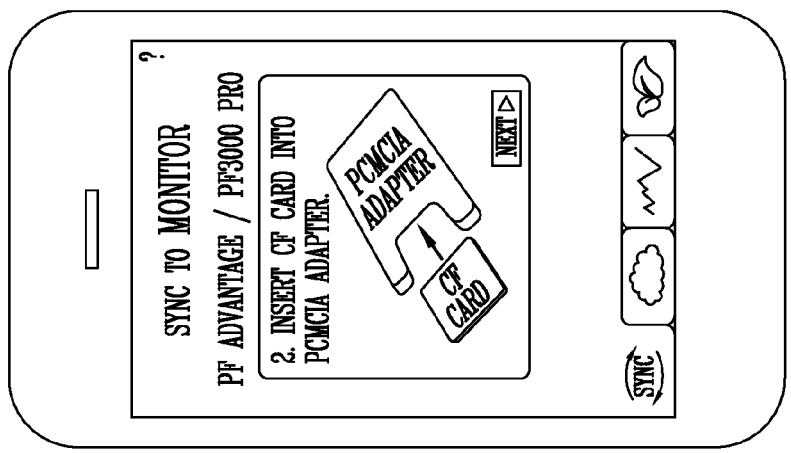
Figure 7E:
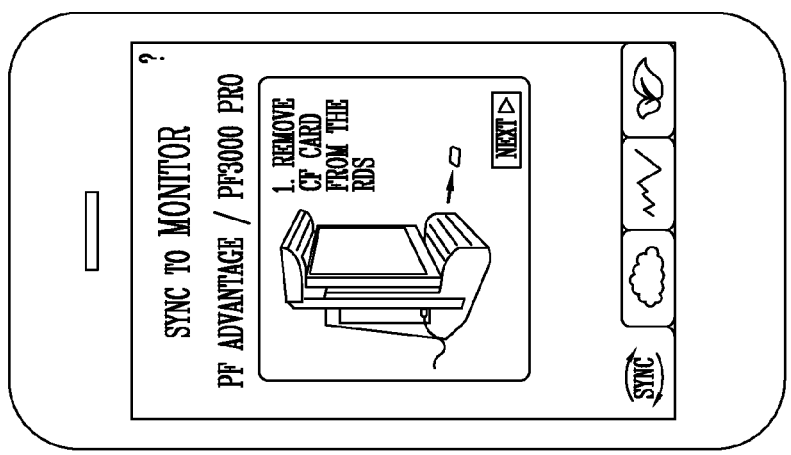
Figure 7D:
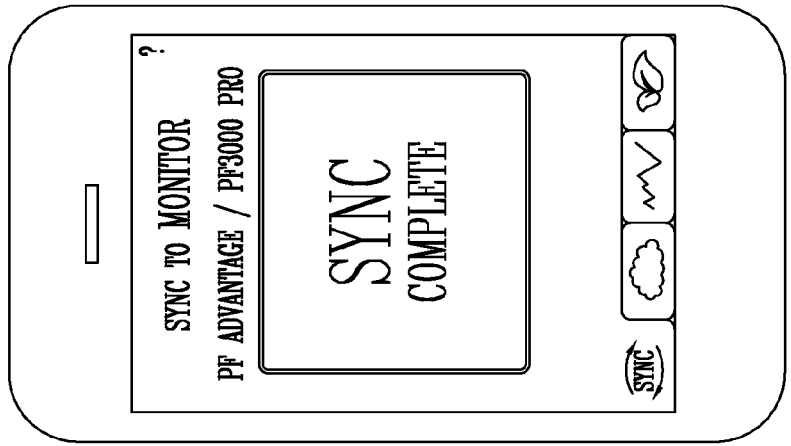
Figure 7H:
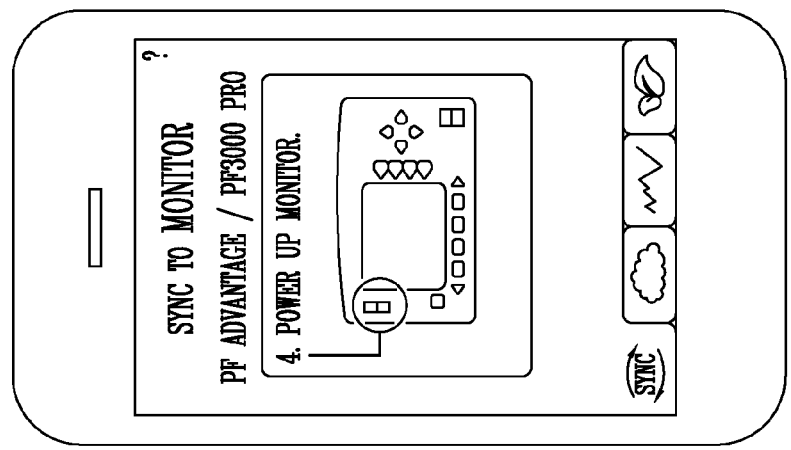
Figure 7G:
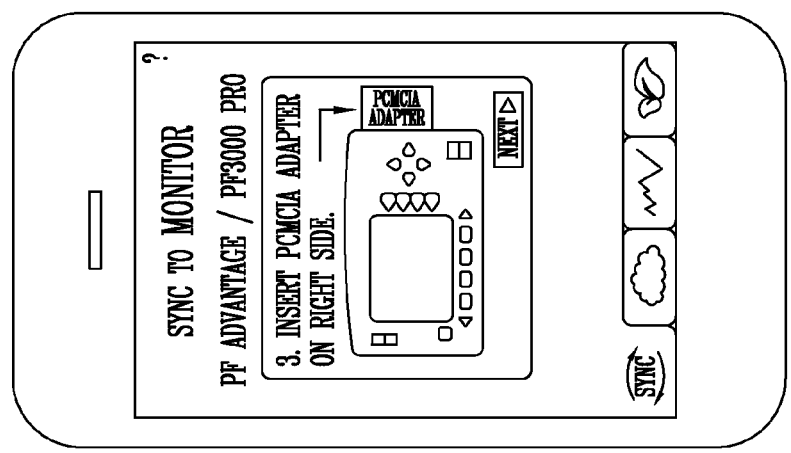

FIGS. 6A-J show how the app guides a user through the process of syncing data from the monitor 16 to the cloud 26. FIGS. 6A-J represent screenshots of a mobile device 28 running the app. In FIG. 6A a general screen is shown that is used to initiate the app. In order to link the mobile device 28 with the synchronization device 24 the screen of FIG. 6A instructs a user to scan the appropriate QR code for the monitor. Once the QR code is scanned, the screen of FIG. 6B appears allowing a user to choose whether the wish to sync to the cloud or sync from the cloud to the monitor. The screen of FIG. 6C appears if the user has selected to sync from the monitor to the cloud. The screen of FIG. 6C is customized to provide the appropriate instructions depending upon the particular monitor being used. For example, in FIGS. 6D-F the process is shown and described whereby a PCMIA adapter is removed from the monitor, a CF card is removed from a PCMIA adapter and then inserted into the synchronization device 24 in order to move the data from the monitor 16 to the device 24. As an alternative, in some embodiments a USB cable may be connected between the monitor and the synchronization device. The LED lights 62 may be illuminated as appropriate to provide an additional visual indicator to a user when a successful connection has been established between the synchronization device 24 and the monitor 16. The screen of FIG. 6G appears once all the data related to the implement has been downloaded from the monitor 16 to the synchronization device 24. FIGS. 6H and I then show screens that appears while the data that has been downloaded from the monitor 16 to the synchronization device 24 is being transferred from the synchronization device 24 to the mobile device 28. Once all of the data has been transferred to the mobile device 28, the mobile device 28 will display the screen shown in FIG. 6J to communicate to a user that the synchronization process is complete.

According to another feature of the present invention, the mobile device 28 will check for cellular communication coverage. If cellular communication coverage is not available, the mobile device 28 will store the data, and continue to periodically check for cellular communication coverage. Once the mobile device 28 is brought within an area where it has cellular communication coverage, the mobile device 28 will automatically download the data to the cloud 26, or other server, through the cellular network. If cellular coverage is lost during a downloading process, the mobile device will keep track of what data remains to be sent, and upon sensing that cellular communication is again available, will download the rest of the data.

The mobile device 28 may use Rsync compression software, which is available as open source software, to compress and efficiently store the data. This allows for good security and compression of the data. This arrangement assures that the data will be downloaded to the cloud 26 as soon as possible, but avoids the need for a user to continually check whether they have cellular coverage, as the system will automatically check and will send the information when cellular coverage is present. Other compression software may be used by those of skill in the art who will recognize acceptable alternatives.

FIGS. 7A-H are screenshots of the display that appears on the mobile device 28 during a process of syncing information from the cloud 26 to the monitor 16. These screens appear because the app on the mobile device 28 acts as a wizard tailored to each monitor type to walk a user through the process. The screens of FIGS. 6A and 6B would appear to a user prior to the screens shown in 7A-H. At the screen of FIG.

6B, the user would select the sync to monitor option. That would cause the screen of FIG. 7A to appear on the mobile device 28. Screen 7A describes to a user how to insert a CF card taken from the monitor 16 into the synchronization device 24. For other models, the screen might describe how to connect a USB cable from the monitor 16 to the synchronization device 24. Once the card is properly inserted into the device 24, the device 24 will automatically begin to extract data from the card. Screens 7B and 7C track the progress of the synchronization of the information. Screen 7D informs a user that the synchronization is complete. Screens 7E-H instruct and illustrate how to put the card back into the PCM-CIA adapter and the PCMCIA adapter back into the monitor.

The synchronization device 24 may be used with several different agricultural implements 12. There is no need that the implements 12 all be from the same manufacturer. The cloud 26 or the user's computer 22 may be provided with software that translate the data format from several different types of vendors into a common format, such that a grower who uses several different types of equipment can have their data easily transformed into a single unified report.

Figure 8A:
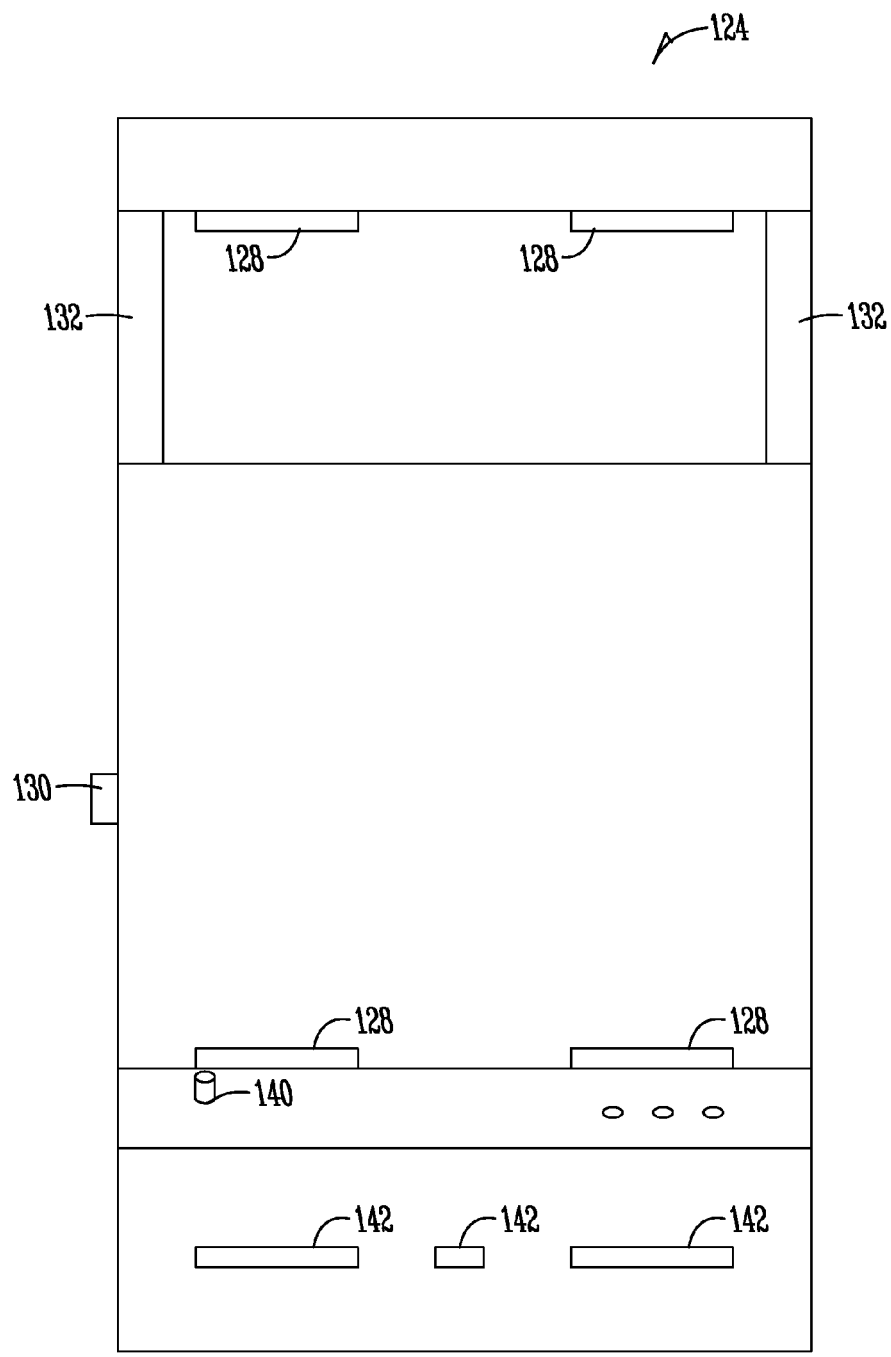
FIGS. 8A-B illustrate an alternative embodiment of a synchronization device that includes a cradle for supporting a mobile device, according to another embodiment of the present invention.
Figure 8B:
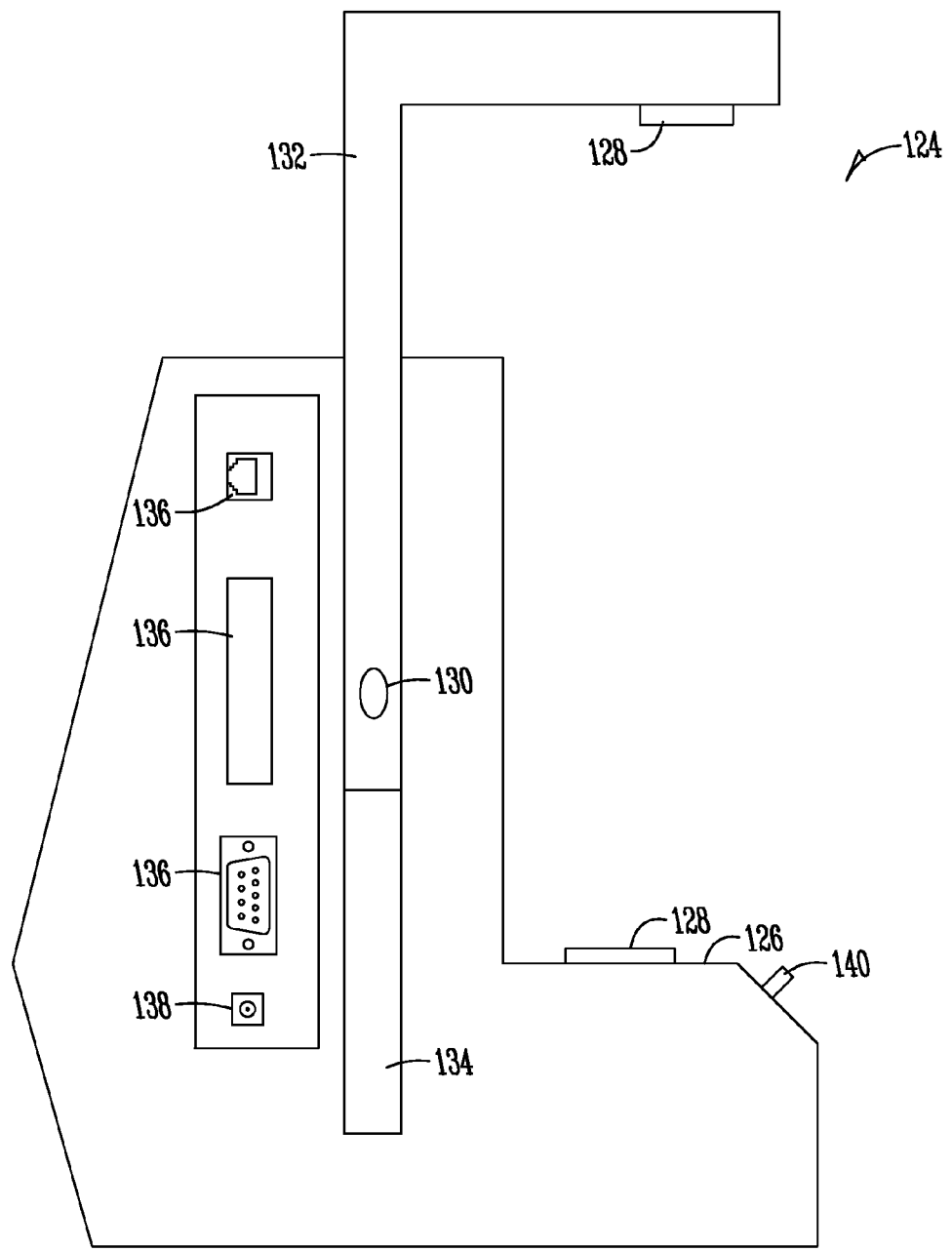

FIGS. 8A and 8B show an alternative embodiment for a synchronization device 124. The internal workings of synchronization device 124 are similar to that described above with respect to synchronization device 124, except that synchronization device 124 includes a cradle 126 for mounting the mobile device 28 to the synchronization device 124. The cradle 126 includes pads 128 that engage and retain the mobile device 28 within the cradle 126. The space between the pads 128 may be adjusted by sliding arm 132 up and down within track 134. A release 130 may be provided on the arm 132 to retain and release the arm 132 within the track 134. The synchronization device 124 includes input and output jacks 136 and a power input 138. An indicator light 140 is provided to provide status information. As can be seen in front view 8A, the synchronization device 124 also includes a plurality of card reader input slots 142 to permit a variety of memory cards to be used. It may also be possible to include a provision on the synchronization device 124 of an output to charge a mobile device 28 that is provided within the cradle 126.

Although specific embodiments are described herein, the present invention contemplates numerous variations, options, and alternatives, including variations in the structure or configuration of the refrigerator, and variations in the type of material used.

The present invention is not to be limited to the specific embodiments described herein or combinations of the specific embodiments described.

What is claimed is:

1. A system for processing and displaying agricultural data, the system comprising:
   a monitor, the monitor adapted to receive implement data front an agricultural implement and adapted to store the implement data on a monitor storage medium, the monitor further including a display screen;
   a synchronization device, the synchronization device including equipment to receive the implement data from the monitor storage medium, the synchronization device further including a synchronization device short-range communicator;
   a mobile device, the mobile device including a mobile device short-range communicator and long range communication equipment, the mobile device short-range communicator being in communication to receive the implement data from the synchronization device short-range communicator, the mobile device further comprising a processor programmed with an application that causes the mobile device to display instruction screens instructing a user how to synchronize data from the monitor to the server using the synchronization device and includes a plurality of sets of instruction screens corresponding to a plurality of different types of monitors, wherein the processor of the mobile device is adapted to select a set of instructions screens corresponding to the monitor from the plurality of sets of instruction screens bused on a scanned code; and
   a server adapted to receive information transmitted by the mobile device long range communication equipment, the server further adapted to manipulate the implement data into processed agricultural data.

2. The system of claim 1, wherein the application causes the mobile device to control the synchronization device.

3. The system of claim 1, wherein the mobile device is adapted to retrieve the processed agricultural data from the server.

4. The system of claim 3, wherein the mobile device is adapted to transmit the processed agricultural data to the synchronization device.

5. The system of claim 1 wherein the processor of the mobile device is adapted to compress the implement data to a compressed format.

6. The system of claim 5, wherein the application causes the mobile device to send the implement data in a compressed format to the server.

7. The system of claim 6, wherein the application causes the mobile device to send the compressed format implement data to the server automatically when the mobile device has cellular communication coverage.

8. The system of claim 7, wherein the application causes the mobile device to store the compressed format implement data until the mobile device has cellular communication coverage.

9. The system of claim 1, wherein the scanned code is a QR code.

* * * * *